(12) United States Patent
Schwarz et al.

(10) Patent No.: US 10,794,288 B2
(45) Date of Patent: Oct. 6, 2020

(54) COOLED COOLING AIR SYSTEM FOR A TURBOFAN ENGINE

(71) Applicant: United Technologies Corporation, Hartford, CT (US)

(72) Inventors: Frederick M. Schwarz, Glastonbury, CT (US); Paul W. Duesler, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 836 days.

(21) Appl. No.: 14/793,119

(22) Filed: Jul. 7, 2015

(65) Prior Publication Data

US 2017/0009657 A1 Jan. 12, 2017

(51) Int. Cl.
*F02C 7/18* (2006.01)
*F02K 3/06* (2006.01)
(Continued)

(52) U.S. Cl.
CPC .............. *F02C 7/18* (2013.01); *F02C 7/04* (2013.01); *F02C 7/042* (2013.01); *F02C 7/141* (2013.01); *F02C 7/16* (2013.01); *F02C 7/185* (2013.01); *F02C 9/18* (2013.01); *F02K 3/02* (2013.01); *F02K 3/06* (2013.01); *F02K 3/075* (2013.01);
(Continued)

(58) Field of Classification Search
CPC .... F02C 7/04; F02C 7/042; F02C 7/14; F02C 7/141; F02C 7/16; F02C 7/18; F02C 7/185; F02C 7/28; F02C 9/18; F05D 2260/213; F05D 2220/3219; F05D 2250/90; F02K 3/02; F02K 3/075; F02K 3/077
See application file for complete search history.

(56) References Cited

U.S. PATENT DOCUMENTS 2,692,476 A 10/1954 Schaal et al.
3,575,528 A * 4/1971 Beam, Jr. ............... F01D 5/08
416/39

(Continued)

FOREIGN PATENT DOCUMENTS

DE 2852057 6/1979
EP 0447886 9/1991
(Continued)

OTHER PUBLICATIONS

Gunston, Bill. (2009). Cambridge Aerospace Dictionary (2nd Edition). Cambridge University Press. pp. 726-727. Retrieved from https://app.knovel.com/hotlink/toc/id:kpCADE0003/cambridge-aerospace-dictionary/cambridge-aerospace-dictionary (Year: 2009).*

(Continued)

*Primary Examiner* — Gerald L Sung
*Assistant Examiner* — Marc J Amar
(74) *Attorney, Agent, or Firm* — Carlson, Gaskey & Olds, P.C.

(57) ABSTRACT

An exemplary gas turbine engine includes a fan bypass duct defined between a fan nacelle and core cowl of an engine core. The engine core includes a cooled cooling air system configured to receive cooling air from a primary flowpath bleed at a diffuser within the engine core and configured to provide cooled cooling air to at least one component within the engine core. The cooled cooling air system including an air-air heat exchanger.

20 Claims, 4 Drawing Sheets

(51) Int. Cl.
- *F02C 7/141* (2006.01)
- *F02C 9/18* (2006.01)
- *F02K 3/075* (2006.01)
- *F02C 7/042* (2006.01)
- *F02C 7/16* (2006.01)
- *F02C 7/04* (2006.01)
- *F02K 3/02* (2006.01)

(52) U.S. Cl.
CPC .. *F05D 2220/3219* (2013.01); *F05D 2220/36* (2013.01); *F05D 2250/51* (2013.01); *F05D 2250/90* (2013.01); *F05D 2260/213* (2013.01); *Y02T 50/675* (2013.01)

(56) References Cited

U.S. PATENT DOCUMENTS

| | | | | |
|---|---|---|---|---|
| 3,584,458 | A * | 6/1971 | Wetzler | F01D 17/162 60/782 |
| 3,619,077 | A * | 11/1971 | Wile | F01D 5/18 415/115 |
| 3,851,464 | A * | 12/1974 | Davis | F02C 9/32 60/39.281 |
| 3,878,677 | A | 4/1975 | Colvin | |
| 3,886,729 | A * | 6/1975 | Amann | B60K 3/04 60/39.24 |
| 4,180,371 | A * | 12/1979 | Ivanko | F01D 5/18 415/115 |
| 4,254,618 | A | 3/1981 | Elovic | |
| 4,539,945 | A | 9/1985 | Bosisio | |
| 4,882,902 | A | 11/1989 | Reigel et al. | |
| 5,056,335 | A | 10/1991 | Renninger et al. | |
| 5,076,050 | A * | 12/1991 | Schwarz | F01D 11/24 415/117 |
| 5,154,052 | A * | 10/1992 | Giffin, III | F02K 1/006 239/265.13 |
| 5,269,135 | A * | 12/1993 | Vermejan | F02C 7/04 60/226.1 |
| 5,305,616 | A | 4/1994 | Coffinberry | |
| 5,317,877 | A * | 6/1994 | Stuart | F02C 7/185 60/736 |
| 5,351,732 | A * | 10/1994 | Mills | F01D 11/24 415/115 |
| 5,392,614 | A | 2/1995 | Coffinberry | |
| 5,414,992 | A | 5/1995 | Glickstein | |
| 5,452,573 | A | 9/1995 | Glickstein et al. | |
| 5,498,126 | A | 3/1996 | Pighetti et al. | |
| 5,724,806 | A | 3/1998 | Horner | |
| 5,758,485 | A | 6/1998 | Frutschi | |
| 5,867,979 | A | 2/1999 | Newton et al. | |
| 5,918,458 | A | 7/1999 | Coffinberry et al. | |
| 6,050,079 | A | 4/2000 | Durgin et al. | |
| 6,065,282 | A | 5/2000 | Fukue et al. | |
| 6,134,880 | A | 10/2000 | Yoshinaka | |
| 6,430,931 | B1 | 8/2002 | Horner | |
| 6,487,863 | B1 | 12/2002 | Chen et al. | |
| 6,612,114 | B1 | 9/2003 | Klingels | |
| 6,892,523 | B2 | 5/2005 | Fetescu et al. | |
| 7,237,386 | B2 | 7/2007 | Hoffmann et al. | |
| 7,246,484 | B2 | 7/2007 | Giffin, III et al. | |
| 7,284,377 | B2 | 10/2007 | Joshi et al. | |
| 7,306,424 | B2 | 12/2007 | Romanov et al. | |
| 7,334,412 | B2 | 2/2008 | Tiemann | |
| 7,347,637 | B2 | 3/2008 | Kubo et al. | |
| 7,418,813 | B2 * | 9/2008 | Wollenweber | F02K 1/825 181/213 |
| 7,500,365 | B2 | 3/2009 | Suciu et al. | |
| 7,552,591 | B2 | 6/2009 | Bart et al. | |
| 7,698,884 | B2 | 4/2010 | Maguire et al. | |
| 7,765,788 | B2 | 8/2010 | Schwarz | |
| 7,823,389 | B2 | 11/2010 | Seitzer et al. | |
| 7,882,691 | B2 | 2/2011 | Lemmers, Jr. et al. | |
| 7,886,520 | B2 | 2/2011 | Stretton et al. | |
| 8,015,828 | B2 | 9/2011 | Moniz et al. | |
| 8,037,686 | B2 | 10/2011 | Lasker | |
| 8,087,249 | B2 | 1/2012 | Ottaviano et al. | |
| 8,181,443 | B2 | 5/2012 | Rago | |
| 8,307,662 | B2 | 11/2012 | Turco | |
| 8,350,398 | B2 | 1/2013 | Butt | |
| 8,397,487 | B2 * | 3/2013 | Sennoun | B64D 13/06 60/266 |
| 8,402,742 | B2 | 3/2013 | Roberge et al. | |
| 8,434,997 | B2 | 5/2013 | Pinero et al. | |
| 8,511,967 | B2 | 8/2013 | Suciu et al. | |
| 8,522,529 | B2 | 9/2013 | Martinou et al. | |
| 8,572,982 | B2 | 11/2013 | Tiemann | |
| 8,602,717 | B2 | 12/2013 | Suciu et al. | |
| 8,621,871 | B2 | 1/2014 | McCune et al. | |
| 8,727,703 | B2 | 5/2014 | Laurello et al. | |
| 8,776,952 | B2 | 7/2014 | Schwarz et al. | |
| 8,814,502 | B2 | 8/2014 | Eleftheriou | |
| 8,876,465 | B2 | 11/2014 | Stretton | |
| 8,961,108 | B2 | 2/2015 | Bergman et al. | |
| 9,234,481 | B2 | 1/2016 | Suciu et al. | |
| 9,243,563 | B2 * | 1/2016 | Lo | F02C 7/18 |
| 9,255,492 | B2 | 2/2016 | Bacic | |
| 9,297,391 | B2 | 3/2016 | Rued et al. | |
| 9,422,063 | B2 | 8/2016 | Diaz | |
| 9,429,072 | B2 | 8/2016 | Diaz et al. | |
| 9,624,832 | B2 * | 4/2017 | Fletcher | F02C 7/141 |
| 9,764,435 | B2 * | 9/2017 | Morris | F02C 7/10 |
| 2003/0046938 | A1 | 3/2003 | Mortzheim et al. | |
| 2004/0088995 | A1 | 5/2004 | Reissig | |
| 2005/0172612 | A1 | 8/2005 | Yamanaka et al. | |
| 2007/0022735 | A1 | 2/2007 | Henry et al. | |
| 2007/0213917 | A1 | 9/2007 | Bruno et al. | |
| 2007/0245738 | A1 | 10/2007 | Stretton et al. | |
| 2008/0028763 | A1 | 2/2008 | Schwarz et al. | |
| 2008/0230651 | A1 | 9/2008 | Porte | |
| 2008/0253881 | A1 * | 10/2008 | Richards | F02C 7/052 415/145 |
| 2009/0007567 | A1 * | 1/2009 | Porte | F02C 7/141 60/785 |
| 2009/0090096 | A1 | 4/2009 | Sheridan | |
| 2009/0145102 | A1 | 6/2009 | Roberge et al. | |
| 2009/0196736 | A1 | 8/2009 | Sengar et al. | |
| 2009/0196737 | A1 * | 8/2009 | Mitchell | F01D 5/186 415/115 |
| 2009/0226297 | A1 * | 9/2009 | Yanagi | B64C 7/02 415/58.5 |
| 2009/0272120 | A1 | 11/2009 | Tiemann | |
| 2010/0043396 | A1 | 2/2010 | Coffinberry | |
| 2010/0154434 | A1 | 6/2010 | Kubota et al. | |
| 2011/0036066 | A1 | 2/2011 | Zhang et al. | |
| 2011/0088405 | A1 | 4/2011 | Turco | |
| 2011/0120083 | A1 | 5/2011 | Giffin et al. | |
| 2011/0247344 | A1 | 10/2011 | Glahn et al. | |
| 2012/0067055 | A1 | 5/2012 | Held | |
| 2012/0102915 | A1 | 5/2012 | Baltas | |
| 2012/0159961 | A1 | 6/2012 | Krautheim et al. | |
| 2012/0180509 | A1 | 7/2012 | DeFrancesco | |
| 2012/0216545 | A1 * | 8/2012 | Sennoun | B64D 13/06 60/772 |
| 2013/0036747 | A1 | 2/2013 | Fuchs et al. | |
| 2013/0067928 | A1 | 3/2013 | Arias Chao et al. | |
| 2013/0098059 | A1 | 4/2013 | Suciu et al. | |
| 2013/0145744 | A1 * | 6/2013 | Lo | F01D 17/105 60/226.3 |
| 2013/0145774 | A1 | 6/2013 | Duong et al. | |
| 2013/0186102 | A1 | 7/2013 | Lo | |
| 2013/0192263 | A1 * | 8/2013 | Suciu | F02K 3/072 60/805 |
| 2013/0199156 | A1 | 8/2013 | Ress, Jr. et al. | |
| 2013/0239583 | A1 | 9/2013 | Suciu et al. | |
| 2013/0319002 | A1 | 12/2013 | Sidelkovskiy et al. | |
| 2014/0020506 | A1 | 1/2014 | Duong | |
| 2014/0084130 | A1 * | 3/2014 | Rejman | F02C 7/32 248/646 |
| 2014/0137417 | A1 | 5/2014 | Silberberg et al. | |
| 2014/0196469 | A1 | 7/2014 | Finney et al. | |
| 2014/0219794 | A1 * | 8/2014 | Yilmaz | F02C 7/12 416/1 |

(56) References Cited

U.S. PATENT DOCUMENTS

| | | | |
|---|---|---|---|
| 2014/0230444 A1 | 8/2014 | Hao et al. | |
| 2014/0250898 A1 | 9/2014 | Mackin et al. | |
| 2014/0260326 A1 | 9/2014 | Schwarz et al. | |
| 2014/0311157 A1 | 10/2014 | Laurello et al. | |
| 2014/0341704 A1* | 11/2014 | Fletcher | F02K 3/115 |
| | | | 415/1 |
| 2014/0352315 A1 | 12/2014 | Diaz | |
| 2015/0114611 A1* | 4/2015 | Morris | F02C 7/10 |
| | | | 165/166 |
| 2015/0176843 A1* | 6/2015 | Garry | F23M 5/04 |
| | | | 60/753 |
| 2015/0285147 A1 | 10/2015 | Phillips et al. | |
| 2015/0308339 A1 | 10/2015 | Forcier | |
| 2015/0330236 A1 | 11/2015 | Beecroft et al. | |
| 2015/0354465 A1 | 12/2015 | Suciu et al. | |
| 2015/0354822 A1 | 12/2015 | Suciu et al. | |
| 2016/0010554 A1 | 1/2016 | Suciu et al. | |
| 2016/0131036 A1 | 5/2016 | Bintz et al. | |
| 2016/0131037 A1 | 5/2016 | Spangler et al. | |
| 2016/0169118 A1 | 6/2016 | Duong | |
| 2016/0215732 A1 | 7/2016 | Malecki | |
| 2016/0237906 A1 | 8/2016 | Suciu et al. | |
| 2016/0312797 A1 | 10/2016 | Suciu et al. | |
| 2016/0341125 A1 | 11/2016 | Kraft et al. | |
| 2016/0369697 A1 | 12/2016 | Schwarz et al. | |
| 2017/0009657 A1 | 1/2017 | Schwarz et al. | |
| 2017/0044980 A1 | 2/2017 | Duesler et al. | |
| 2017/0044982 A1 | 2/2017 | Duesler et al. | |
| 2017/0152765 A1 | 6/2017 | Uechi et al. | |
| 2017/0159568 A1 | 6/2017 | Sennoun et al. | |
| 2017/0167388 A1 | 6/2017 | Merry et al. | |
| 2017/0175632 A1 | 6/2017 | Hanrahan et al. | |
| 2017/0184027 A1 | 6/2017 | Moniz et al. | |
| 2017/0204787 A1 | 7/2017 | Duesler et al. | |

FOREIGN PATENT DOCUMENTS

| | | |
|---|---|---|
| EP | 0469825 | 2/1992 |
| EP | 0608142 | 7/1994 |
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3121411 | 1/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

European Search Report for Application No. 16178207.3 dated Nov. 21, 2016.

Dornheim, Michael A., Rolls-Royce Trent 1000 to Drive Boeing 787 Accessories From IP Spool, Aviation Week & Space Technology, Mar. 28, 2005, p. 51, Los Angeles, CA.

U.S. Appl. No. 15/232,101.

U.S. Appl. No. 14/964,984.

U.S. Appl. No. 14/967,446.

U.S. Appl. No. 15/069,197.

U.S. Appl. No. 15/269,014.

U.S. Appl. No. 15/373,072.

European Search Report for European Application No. 16166707.6 dated Sep. 26, 2016.

European Search Report for European Application No. 16166724.1 dated Sep. 26, 2016.

European Search Report for European Patent Application No. 16154635.3 dated Jul. 6, 2016.

European Search Report for European Application No. 16155316.9 completed Jun. 30, 2016.

European Search Report for Application No. 16170021.6 dated Oct. 11, 2016.

European Search Report for Application No. 16174862.9 dated Nov. 7, 2016.

European Search Report for European Application No. 16175531.9 dated Nov. 15, 2016.

European Search Report for European Application No. 16175533.5 dated Nov. 15, 2016.

European Search Report for European Application No. 16175552.5 dated Nov. 17, 2016.

European Search Report for European Application No. 16175760.4 dated Nov. 16, 2016.

European Search Report for EP Application No. 17160816.9 dated Jul. 21, 2017.

European Search Report for European Application No. 16202876.5 dated Apr. 24, 2017.

European Search Report for European Application No. 16180657.5 dated Dec. 16, 2016.

* cited by examiner

COOLED COOLING AIR SYSTEM FOR A TURBOFAN ENGINE

TECHNICAL FIELD

The present disclosure relates generally to turbofan engines, and more specifically to a cooled cooling air system for utilization within a turbofan engine.

BACKGROUND

Gas turbine engines, such as those utilized on commercial aircraft, typically include a compressor section that draws in and compresses air, a combustor section where the compressed air is mixed with a fuel and ignited, and a turbine section across which the combustion gasses from the ignition are expanded. Expansion of the combustion gasses across the turbine section drives rotation of the turbine section, which in turn drives rotation of the compressor section. Each of the compressor section, the combustor section, and the turbine section are contained within an engine core, and are connected by a primary flowpath that flows through each of the sections.

Fore of the compressor section is a fan that drives air through a fan bypass duct surrounding the engine core. As with the compressors, the fan is connected to the turbine section via a drive shaft. In some example engines, the fan is connected through a gear system, and the engine is referred to as a geared turbofan engine. In alternative engines, the fan is connected directly to a turbine in the turbine section via a drive shaft and the engine is referred to as a direct drive engine.

In order to cool some components of the engine, cooling air is provided from a cooling air system directly to the cooled components. In order to provide more efficient cooling, the cooling air in some examples is actively cooled. A system for actively cooling the cooling air is referred to as a cooled cooling air system.

SUMMARY OF THE INVENTION

Disclosed is an exemplary gas turbine engine including: a fan bypass duct defined between a fan nacelle and core cowl of an engine core, the engine core including a cooled cooling air system configured to receive cooling air from a primary flowpath bleed within the engine core and configured to provide cooled cooling air to at least one component within the engine core, and the cooled cooling air system including an air-air heat exchanger.

In a further example of the previously described gas turbine engine, the heat exchanger is disposed within the engine core, a cold air duct connects a cold air inlet of the heat exchanger to said fan bypass duct, and a spent air duct connects a spent air outlet of the heat exchanger to an outlet port, and wherein at least one of the cold air duct, the spent air duct, and the air-air heat exchanger are structurally supported by at least one connection to the core cowl.

In a further embodiment of any of the previously described gas turbine engines, a high pressure side of the air-air heat exchanger is structurally supported by a connection to the core cowl In a further embodiment of any of the previously described gas turbine engines, the cooled cooling air system includes a cold air modulator configured to regulate a flow of cold air to the heat exchanger.

In a further embodiment of any of the previously described gas turbine engines, the modulator is a hinged scoop configured to increase a pressure of fan duct air at an inlet of a cold air duct.

In a further embodiment of any of the previously described gas turbine engines, the hinged scoop is flush with a radially outward surface of the core cowl in a closed position, and wherein the hinged scoop extends radially into the fan bypass duct in an open position.

In a further embodiment of any of the previously described gas turbine engines, the hinged scoop includes side walls having a radially aligned aspect.

In a further embodiment of any of the previously described gas turbine engines, the modulator is upstream of the heat exchanger.

A further embodiment of any of the previously described gas turbine engines further includes a controller controllably coupled to the modulator and configured to modulate the flow of cold air to the heat exchanger as a function of engine power.

A further embodiment of any of the previously described gas turbine engines further includes a controller controllably coupled to the modulator and configured to modulate the flow of cold air to the heat exchanger as a function of a rotor speed and an ambient temperature.

In a further embodiment of any of the previously described gas turbine engines, the cooled cooling air system includes a spent air exhaust outlet at a radially outward surface of the core cowl, the spent air exhaust outlet being downstream of a fan bypass duct nozzle.

In a further embodiment of any of the previously described gas turbine engines, the cooled cooling air system includes a spent air exhaust outlet at a radially outward surface of the core cowl, the spent air exhaust outlet being upstream of a fan bypass duct nozzle.

A further embodiment of any of the previously described gas turbine engines further includes a ramp feature protruding radially into the fan bypass duct upstream of the spent air exhaust outlet.

In a further embodiment of any of the previously described gas turbine engines, the ramp feature is moveable along an axis defined by the engine core.

In a further embodiment of any of the previously described gas turbine engines, the ramp feature has a fixed axial position within the fan bypass duct, along an axis defined by the engine core.

In a further embodiment of any of the previously described gas turbine engines, the gas turbine engine is a geared turbofan engine.

In a further embodiment of any of the previously described gas turbine engines, the primary flowpath bleed is positioned at at least one of a diffuser, a combustor section and a compressor flowpath fore of an aft most stage of the compressor flowpath.

Also disclosed is another exemplary gas turbine engine including: a fan bypass duct defined between a fan nacelle and core cowl of an engine core, a cooled cooling air system configured to receive cooling air from a primary flowpath bleed at a combustor section within the engine core and configured to provide cooled cooling air to at least one component within the engine core, the cooled cooling air system including a modulator configured to modulate an inflow of heat sink air from the fan bypass duct dependent upon at least one engine operating condition, and the cooled cooling air system including an air-air heat exchanger.

DETAILED DESCRIPTION OF AN EMBODIMENT

Figure 1:
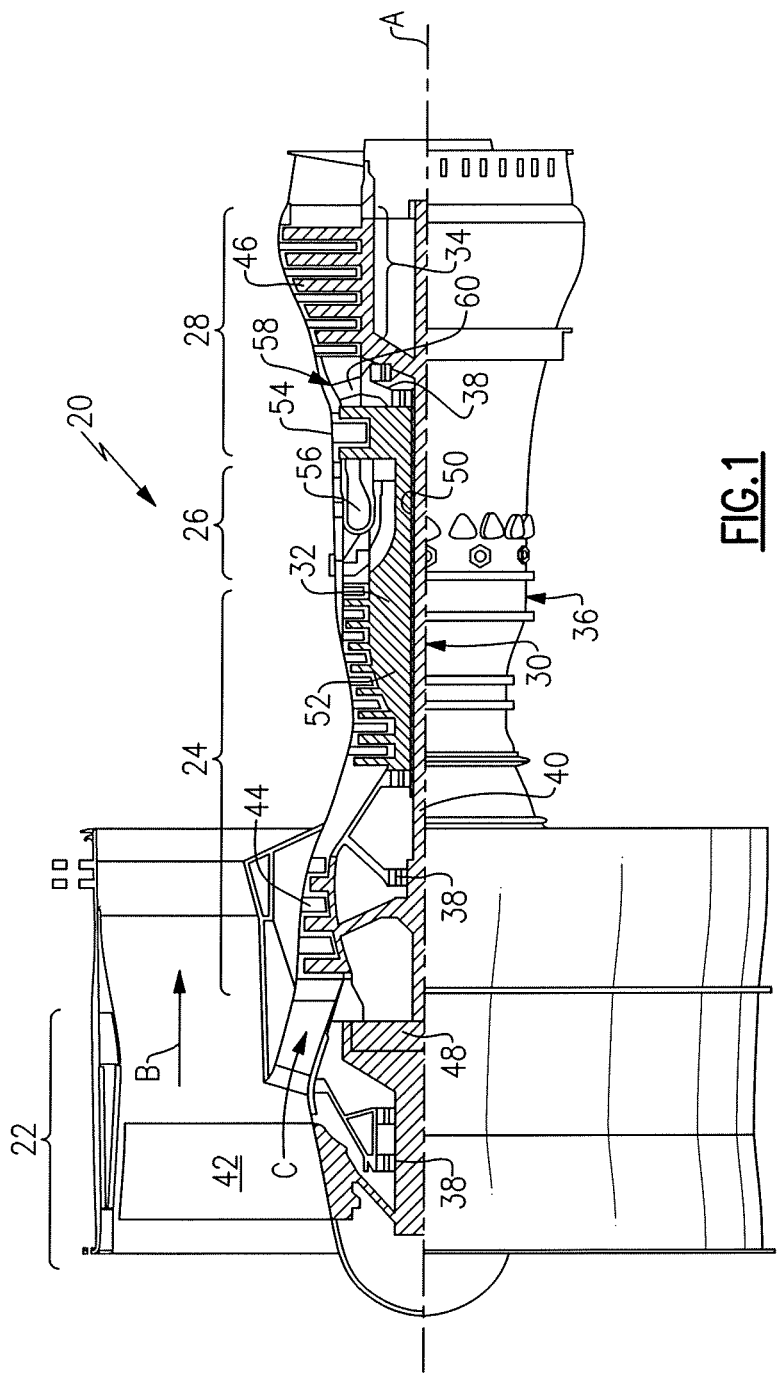
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (1066.8 meters). The flight condition of 0.8 Mach and 35,000 ft (1066.8 m), with the engine at its best fuel consumption—also known as "bucket cruise Thrust Specific Fuel Consumption ('TSFC')T"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/s).

Figure 2:
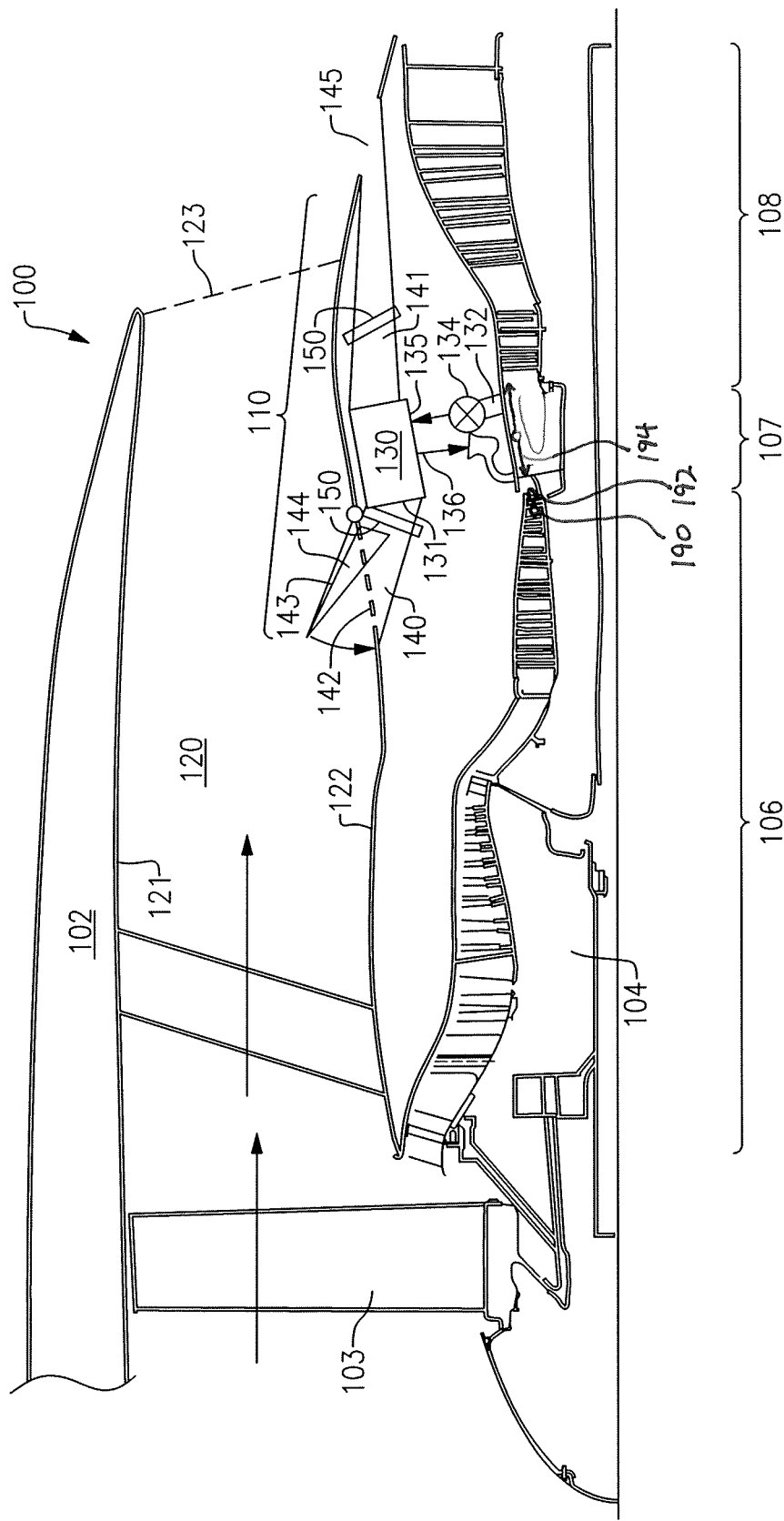
FIG. 2 schematically illustrates an exemplary cooled cooling air system in a gas turbine engine.

With continued reference to FIG. 1, FIG. 2 schematically illustrates a cooled cooling air system 110 in a gas turbine engine 100. The gas turbine engine 100 includes a fan nacelle 102 that radially surrounds an engine core 104. Included within the engine core 104 are a compressor section 106, a combustor section 107 and a turbine section 108. A fan bypass duct 120 is defined between a radially inward facing surface 121 of the fan nacelle 102 and a radially outward facing surface 122 of the engine core 104. A fan 103 is positioned fore of the engine core 104 and drives air through the fan bypass duct 120.

During operation of the gas turbine engine 100, components, such as a last stage of the compressor section 106, are exposed to extreme temperatures. By way of example, the excess power draw required during take-off and ascent to cruising altitude can cause the engine 100 to generate high amounts of heat. In order to cool some sections of the engine 100, a cooled cooling air system 110 is included within the engine core 104. The cooled cooling air system 110 uses a heat exchanger 130 to cool bleed air from the primary flowpath through the engine core 104, and provides the cooled bleed air (referred to as cooled cooling air) to components within the gas turbine engine 100 for cooling.

In the illustrated example, a bleed 132 bleeds air from a combustor case 194 in the combustor section of the combustor section 107 of the engine 100. In alternative examples, the bleed 132 can be connected in the compressor, fore of the aft most stage at position 190. In further alternative examples, the bleed 132 can be connected at a foremost edge of a diffuser at position 192. The air is provided through a valve 134 to a cooling air inlet 135 of the heat exchanger 130. The cooling air is actively cooled within the heat exchanger 130. The cooled cooling air is then sent to at least one component within the gas turbine engine 100 through a cooled cooling air outlet 136. In the illustrated example, the cooled cooling air is provided to the last stage of the compressor section 106. In alternative examples, the cooled cooling air can be provided to one or more additional elements within the gas turbine engine 100, beyond the last stage of the compressor section 106.

In one example, the heat exchanger 130 is an air-air heat exchanger. An air-air heat exchanger utilizes two air flows, with a colder airflow absorbing heat from a hotter airflow within the heat exchanger. In the example of FIG. 2, cold air is drawn into the heat exchanger 130 through a cold air inlet 131 that is connected to a cold air duct 140. Air in the cold air stream that has absorbed heat from the cooling air, is referred to as spent air and is expelled from the heat exchanger 130 into a spent air duct 141. In some examples, the heat exchanger 130 is mounted to the engine core, and the cold air duct 140 and the spent air duct 141 are mounted to, and structurally supported by a connection to, a core cowl surrounding the engine core 104. Included within each of the cold air duct 140 and the spent air duct 141 are kiss seals 150. In yet further examples, a high pressure side of the heat exchanger 130 is structurally supported by a connection to the core cowl.

The cold air duct 140 includes an inlet 142 at a radially exterior surface of the core cowl. The inlet 142 allows cold air from the fan bypass duct 120 to enter the cold air duct 140. In some examples the opening is a hole that is flush with the radially exterior surface of the core cowl. In alternative examples an airflow modulator, such as a scoop 143, can be positioned at the inlet 142. The scoop 143 can be operated in two positions, an open position and a closed position. In an open position the scoop 143 extends radially outward into the fan bypass duct 120. In a closed position, the scoop 143 covers the opening and is flush with the radially exterior surface of the core cowl. In order to facilitate articulation between the open position and the closed position, the scoop 143 is connected to the cold air duct via a hinge. In such an example, the scoop is referred to as a hinged scoop.

The scoop 143 modulates the flow of air into the heat exchanger 130, by prohibiting airflow when in the closed position, and allowing airflow when in the open position. Further, while in the open position, the scoop 143 provides some total pressure recovery from the fan bypass duct by increasing the pressure of the cold air as it enters the cold air duct 140. The airflow modulator is controlled in some examples using an engine controller, and can be shifted to any number of intermediary positions between the open and closed positions. In such an example, the controller can regulate the cold air inflow as a function of engine power, rotor speed and ambient temperature, or any other factor.

The scoop 143 further includes side walls 144, each of which includes a radially aligned aspect. In one example, the side walls 144 can be straight walls directly aligned with the radius of the gas turbine engine 100. In other examples, the side walls 144 can be curved, in which case, the curvature of the side walls 144 includes an aspect aligned with the radius of the engine 100, and an aspect tangential to the circumference of the engine 100.

An outlet 145 of the spent air duct 141 exhausts the spent air downstream of a fan duct nozzle 123. By exhausting the spent air downstream of the fan duct nozzle 123, the spent air is exhausted to an ambient pressure, thereby allowing the spent air exhaust to generate some level of thrust. The thrust generated at the exhaust recovers a portion of the potential thrust lost as a result of removing air from the fan bypass duct 120 at the inlet 142.

Figure 3:
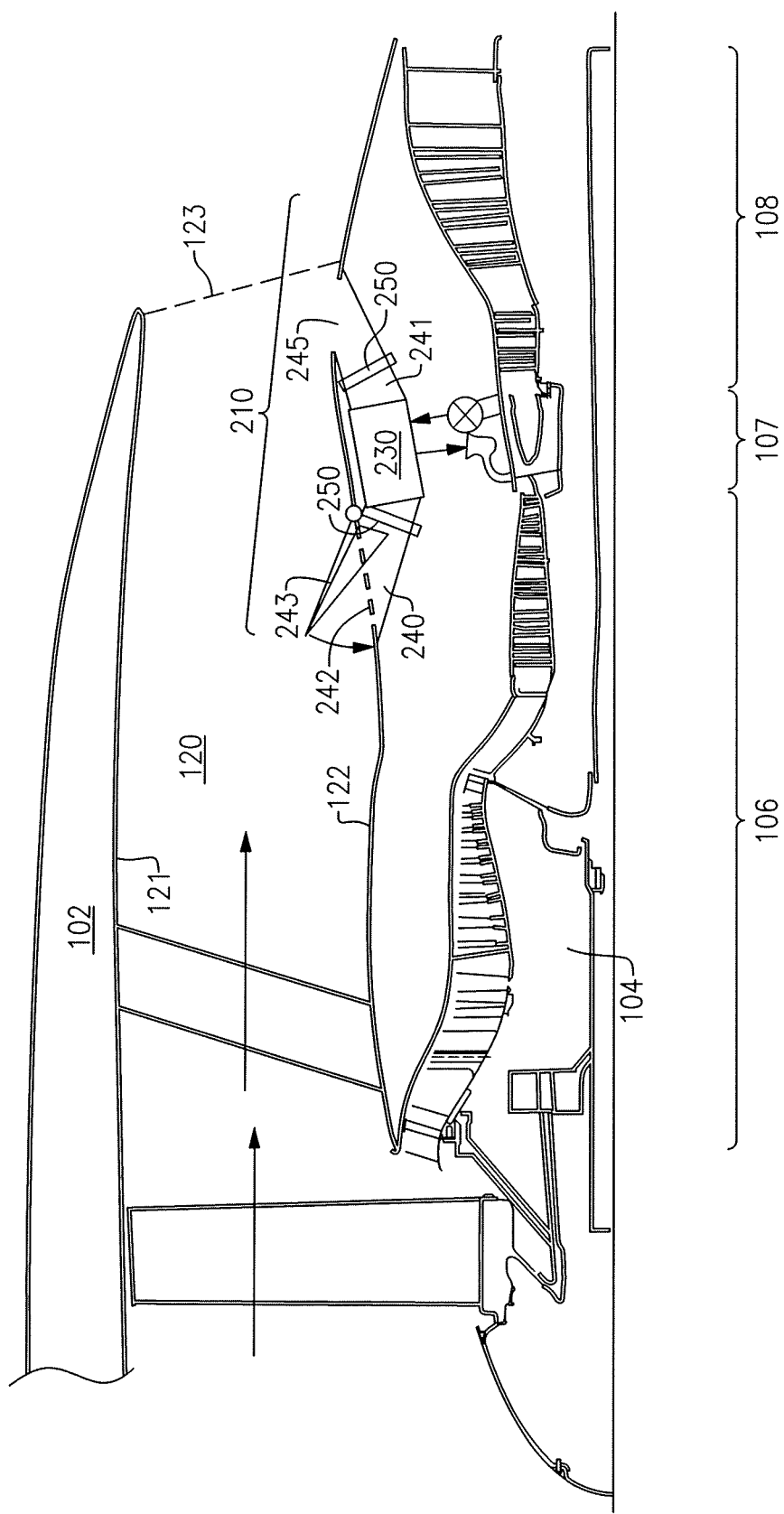
FIG. 3 schematically illustrates a modification to the cooled cooling air system illustrated in FIG. 2.

With continued reference to FIGS. 1 and 2, and with like numerals indicating like elements, FIG. 3 illustrates the example engine 100 of FIG. 2 with a modified implementation of a cooled cooling air system 210. The fan nacelle 102, engine core 104 and fan bypass duct 120 are fundamentally the same structure.

The cooled cooling air system 210 differs from the cooled cooling air system 110 of FIG. 2 in that the outlet 245 of the spent air duct 241 is shifted forward. By shifting the outlet 245 forward, the spent air from the heat exchanger 230 is exhausted into the air stream of the fan duct upstream of the fan duct nozzle 123. The outlet 245 is positioned such that the static pressure of the air stream in the bypass duct 120 at the outlet 245 is less than the total pressure of the air ingested at the modulator 243, or the inlet 242 in examples that do not include a modulator 243. As with the previous examples, the cold air duct 240 and the spent air duct 241 further include kiss seals 250.

Figure 4:
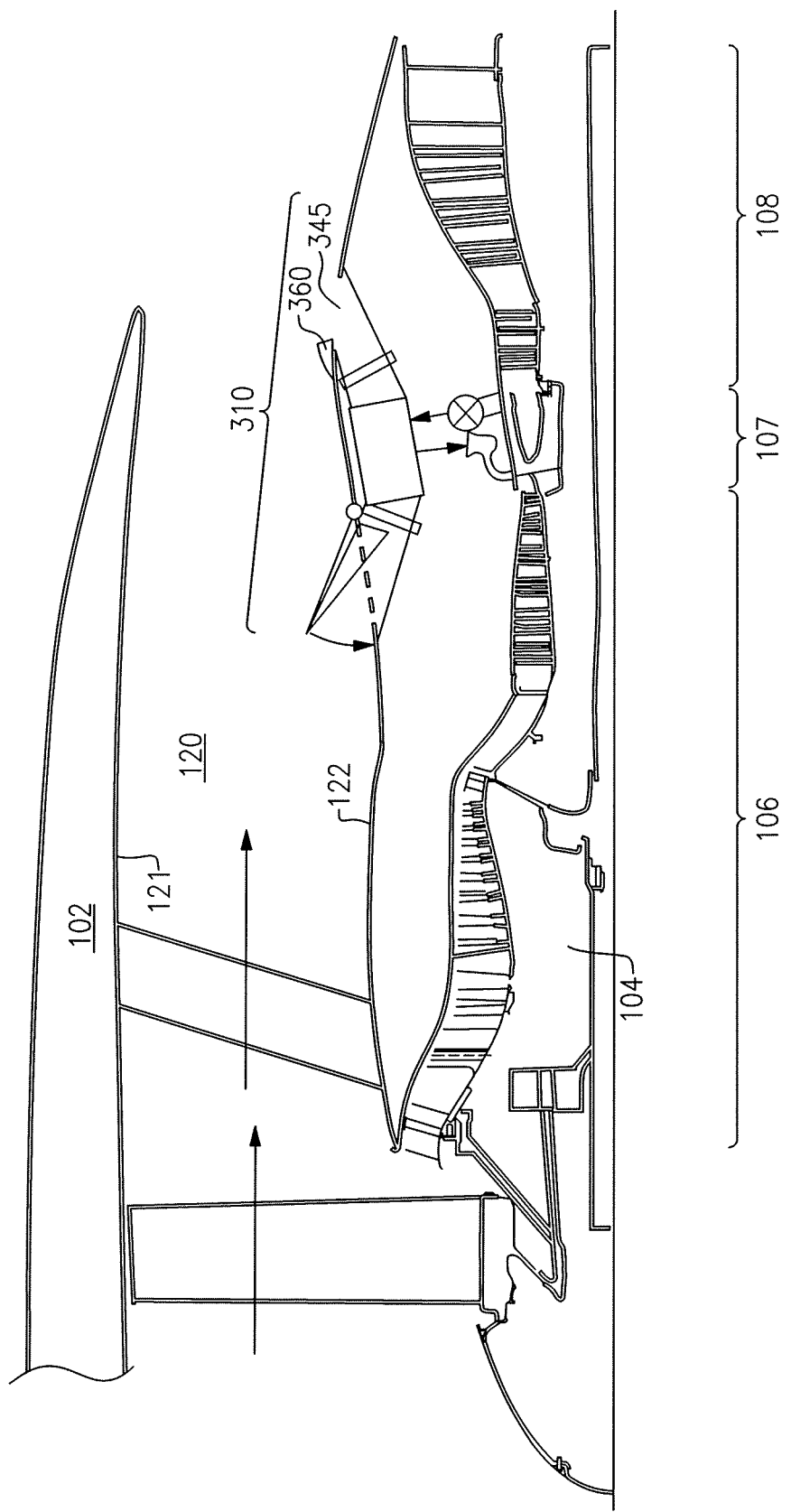
FIG. 4 schematically illustrates a second modification to the cooled cooling air system illustrated in FIG. 2.

With continued reference to FIGS. 2 and 3, FIG. 4 illustrates an additional modification to the fan bypass duct 120 to further increase the effectiveness of the cooled cooling air system 310. The cooled cooling air system is fundamentally identical to the example cooled cooling air system 210 illustrated in FIG. 3, with the addition of a ramp feature 360. The ramp feature 360 introduces an incline surface that protrudes radially further into the air stream of the fan bypass duct 120 as the ramp extends along the axis defined by the fan bypass duct 120. In the illustrated example, the ramp feature 360 is positioned upstream of the outlet 345. By positioning the ramp feature 360 upstream of the outlet 345, the downstream pressure and flow separation in the fan bypass duct 120 at the outlet 345 is reduced.

In some examples, the ramp feature 360 can be mounted to a sliding track and can be moved upstream and downstream within the fan bypass duct 120 and controlled using a controller. The position of the ramp feature 360, relative to the spent air outlet 345, determines the effect that the ramp feature 360 has on the static pressure and airflow separation at the outlet 345. The static pressure and airflow separation, in turn, effect the amount of thrust that is recovered at the outlet 345.

Referring collectively to all of FIGS. 2, 3 and 4, the illustrated cooled cooling air system 110, 210, 310, is mounted on the side of the engine core between 45 degrees and 135 degrees, with 0 degrees being the circumferential position where the engine is connected to an aircraft pylon. In alternative examples, the cooled cooling air system 110, 210, 310 can be mounted in a different position within the engine 100.

While described above with regards to utilization in a geared turbofan engine, such as the geared turbofan engine of FIG. 1, one of skill in the art having the benefit of this disclosure will understand that the cooled cooling air system could be equally applicable to, and utilized in, a direct drive engine with only minor modifications to the disclosed system.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a fan bypass duct defined between a fan nacelle and core cowl of an engine core;
the engine core including a cooled cooling air system configured to receive cooling air from a primary flowpath bleed within the engine core and configured to provide cooled cooling air to at least one component within the engine core, the cooled cooling air system further including a cold air modulator having a first position, a second position, and at least one intermediate position between the first and second positions;
the cooled cooling air system including an air-air heat exchanger; and
a controller controllably connected to the cold air modulator and configured to control a position of said cold air modulator based on at least one of an engine power and a combination of engine rotor speed and ambient temperatureengine operating condition.

2. The gas turbine engine of claim 1, wherein the heat exchanger is disposed within the engine core, a cold air duct connects a cold air inlet of the heat exchanger to said fan bypass duct, and a spent air duct connects a spent air outlet of the heat exchanger to an outlet port, and wherein at least one of the cold air duct, the spent air duct, and the air-air heat exchanger are structurally supported by at least one connection to the core cowl.

3. The gas turbine engine of claim 2, wherein a high pressure side of the air-air heat exchanger is structurally supported by a connection to the core cowl.

4. The gas turbine engine of claim 1, wherein the cold air modulator is configured to regulate a flow of cold air to the heat exchanger.

5. The gas turbine engine of claim 4, wherein the modulator is a hinged scoop configured to increase a pressure of fan duct air at an inlet of a cold air duct.

6. The gas turbine engine of claim 5, wherein the hinged scoop is flush with a radially outward surface of the core cowl in a closed position, and wherein the hinged scoop extends radially into the fan bypass duct in an open position.

7. The gas turbine engine of claim 5, wherein the hinged scoop includes side walls having a radially aligned aspect.

8. The gas turbine engine of claim 4, wherein the modulator is upstream of the heat exchanger.

9. The gas turbine engine of claim 4, wherein the controller is configured to modulate the flow of cold air to the heat exchanger as a function of engine power.

10. The gas turbine engine of claim 4, wherein the controller is configured to modulate the flow of cold air to the heat exchanger as a function of a rotor speed and an ambient temperature.

11. The gas turbine engine of claim 1, wherein the cooled cooling air system includes a spent air exhaust outlet at a radially outward surface of the core cowl, the spent air exhaust outlet being downstream of a fan bypass duct nozzle.

12. The gas turbine engine of claim 1, wherein the cooled cooling air system includes a spent air exhaust outlet at a radially outward surface of the core cowl, the spent air exhaust outlet being upstream of a fan bypass duct nozzle.

13. The gas turbine engine of claim 12, further comprising a ramp feature protruding radially into said fan bypass duct upstream of said spent air exhaust outlet.

14. The gas turbine engine of claim 13, wherein the ramp feature is moveable along a longitudinal axis defined by the engine core.

15. The gas turbine engine of claim 12, wherein the ramp feature has a fixed axial position within the fan bypass duct, along an axis defined by the engine core.

16. The gas turbine engine of claim 1, wherein the gas turbine engine is a geared turbofan engine.

17. The gas turbine engine of claim 1, wherein the primary flowpath bleed is positioned at at least one of a diffuser, a combustor section and a compressor flowpath fore of an aft most stage of the compressor flowpath.

18. The gas turbine engine of claim 6, wherein the controller is configured to modulate the magnitude by which said scoop extends radially into said fan bypass duct as a function of engine power.

19. The gas turbine engine of claim 6, wherein the controller is configured to modulate the magnitude by which said scoop extends radially into said fan bypass duct as a function of an engine rotor speed and an ambient temperature.

20. The gas turbine engine of claim 1, wherein said cooled cooling air system is mounted to the engine core circumferential position between 45 degrees and 135 degrees with an engine mounting pylon defining a 0 degree circumferential position.

* * * * *